(12) United States Patent
Roy

(10) Patent No.: US 11,394,206 B2
(45) Date of Patent: Jul. 19, 2022

(54) SYSTEM FOR PROVIDING RENEWABLE ENERGY STORAGE AND METHODS OF USING THE SAME

(71) Applicant: Switch, Ltd., Las Vegas, NV (US)

(72) Inventor: Rob Roy, Las Vegas, NV (US)

(73) Assignee: Switch, Ltd., Las Vegas, NV (US)

(*) Notice: Subject to any disclaimer, the term of this patent is extended or adjusted under 35 U.S.C. 154(b) by 0 days.

(21) Appl. No.: 16/267,108

(22) Filed: Feb. 4, 2019

(65) Prior Publication Data

US 2019/0245352 A1 Aug. 8, 2019

Related U.S. Application Data

(60) Provisional application No. 62/625,872, filed on Feb. 2, 2018.

(51) Int. Cl.
*H02J 3/38* (2006.01)
*H02J 7/04* (2006.01)
*H02J 7/00* (2006.01)
*H02J 1/10* (2006.01)

(52) U.S. Cl.
CPC ............ *H02J 3/382* (2013.01); *H02J 1/10* (2013.01); *H02J 7/0013* (2013.01); *H02J 7/042* (2013.01)

(58) Field of Classification Search
CPC .... H02J 7/0013; H02J 1/10; H02J 7/34; H02J 2300/20; H02J 2300/22; H02J 3/388; H02J 3/40; H02J 3/42; H02J 3/44; H02J 3/46; H02J 3/466; H02J 3/472; H02J 3/48; H02J 3/50; H02J 7/007; H02J 7/0071; H02J 7/00711; H02J 7/00712; H02J 7/00714; H02J 7/00716; H02J 7/00718; H02J 7/007182; H02J 7/007184; H02J 7/007186; H02J 7/007188; H02J 7/00719; H02J 7/007192; H02J 7/007194
USPC ......................................................... 320/101
See application file for complete search history.

(56) References Cited

U.S. PATENT DOCUMENTS

| | | | | |
|---|---|---|---|---|
| 5,929,538 A * | 7/1999 | O'Sullivan | ............... | H02J 7/34 307/64 |
| 6,459,175 B1 * | 10/2002 | Potega | ............... | H02J 7/00047 307/132 M |
| 6,495,277 B1 * | 12/2002 | Edlund | ............. | H01M 8/04947 429/430 |
| 6,832,135 B2 * | 12/2004 | Ying | ................ | H02J 13/00002 337/16 |
| 7,062,361 B1 * | 6/2006 | Lane | ...................... | F25D 29/00 700/291 |
| 9,383,791 B1 * | 7/2016 | Fan | ......................... | G06F 9/50 |
| 11,025,060 B2 * | 6/2021 | McNamara | ............... | H02J 3/18 |
| 2007/0005192 A1 * | 1/2007 | Schoettle | ................ | H02J 9/062 700/286 |

(Continued)

*Primary Examiner* — M Baye Diao
(74) *Attorney, Agent, or Firm* — Weide & Miller, Ltd.

(57) ABSTRACT

Described herein is a system for consuming, generating, storing, and delivering renewable, redundant, energy and providing backup energy storage and transmission to and from electrical load and method of using the same. The invention relates to a renewable energy consumption, generation, storage, and delivery systems and methods of using the same. A preferred embodiment of the present invention is related to use of the system to provide renewable, redundant, remote backup energy storage and transmission to a mission critical facility such as a data center or colocation facility.

13 Claims, 6 Drawing Sheets

(56) References Cited

U.S. PATENT DOCUMENTS

| | | | | |
|---|---|---|---|---|
| 2010/0039062 A1* | 2/2010 | Gu | ............................ | B60L 53/66 |
| | | | | 320/109 |
| 2010/0306027 A1* | 12/2010 | Haugh | ..................... | H02J 3/008 |
| | | | | 700/291 |
| 2011/0040666 A1* | 2/2011 | Crabtree | ................. | G06Q 50/06 |
| | | | | 702/179 |
| 2012/0046798 A1* | 2/2012 | Orthlieb | ..................... | H02J 3/32 |
| | | | | 700/297 |
| 2015/0185716 A1* | 7/2015 | Wichmann | ................. | F02C 9/28 |
| | | | | 700/287 |
| 2015/0326012 A1* | 11/2015 | Tsuchiya | .................... | H02J 1/14 |
| | | | | 307/20 |
| 2017/0155253 A1* | 6/2017 | Veda | ........................ | H02J 13/00 |

\* cited by examiner

SYSTEM FOR PROVIDING RENEWABLE ENERGY STORAGE AND METHODS OF USING THE SAME

PRIORITY CLAIM

This application claims priority to and the benefit of U.S. Provisional Patent Application No. 62/625,872 entitled "System for Providing Renewable Energy Storage and Methods of Using the Same" filed on Feb. 2, 2018, which application is expressly incorporated by reference herein.

BACKGROUND

Field of the Invention

The present invention relates to renewable energy consumption, generation, storage, and delivery systems and methods of using the same. A preferred embodiment of the present invention is related to use of the system to provide renewable, redundant, remote backup energy storage and transmission to a mission critical facility such as a data center or colocation facility.

Background of the Invention

Mechanisms for consuming, generating, storing, and delivering energy from a multitude of power sources (e.g., solar energy, wind power, geothermal energy, biomass, natural gas, coal, hydropower, electricity, nuclear power, oil, etc.) are well known. In many instances, a single mechanism is used for storing and delivering energy to an electrical load such as a home, an office building, a hotel, a data center, or a colocation facility. These mechanisms put the electrical load at risk of a power outage in the event that the single mechanism for storage and transmission fails. It is known that providing secondary/backup/redundant energy storage and transmission will mitigate the risk of and/or circumvent a power surge, or to provide continuous, stable energy to the electrical load.

Currently, the North American Electric Reliability Corporation (NERC) endeavors to assure the reliability and security of the power grid in the continental United States, Canada, and northern Mexico. The United States' Federal Energy Regulatory Commission (FERC) and government authorities in Canada oversee NERC. As the electric reliability organization (ERO) for North America, NERC has jurisdiction over users, owners, and operators of the bulk power system. NERC's regulations require power providers to maintain a minimum reserve of electrical energy and to provide plans forecasting load requirements. In the United States, power providers trade energy on a complex market that spans state lines and requires power providers to publicly disclose their power purchase schedules. Oftentimes the providers are required to provide a 1-hour notice for purchase schedule changes (known as the "real-time desk"). Schedule changes may arise for a variety of reasons such as weather changes, power generator outages, or power line disruptions that increase or decrease the demand for power in a particular region. When these schedule changes occur the power providers must make decisions to increase or decrease their own power production, and incur the associated fuel costs, or purchase power from another power provider—while at the same time managing the economies associated with these decisions and trades and abiding by NERC rules and regulations.

When a power provider makes a purchase of power from another source, the power must be transmitted through overhead or underground power lines. Transmittal of energy through these lines results in "line loss", where the amount of energy received is lower than the amount of energy transmitted from the source. Transmitting energy across longer lines results in greater line loss. This is another issue that must be considered when power load is purchased at a particular market price. All of these factors being in play in real time can put a strain on power providers' profit margins, as well as the operations and costs incurred by the power market's end users.

Power to an electrical load may also come from power generators that run on a variety of fuels (e.g., gasoline, diesel, propane, natural gas, solar energy, hybrid, etc.) Each of these fuels that are burned by the generator to create electrical power are bought and sold at market prices that fluctuate based on the economic principles of supply and demand.

Different systems for providing backup energy to an electrical load are known in the art. Uninterruptable power supplies (UPS) incorporating backup generators, flywheels, and batteries are known in the art, each offering certain advantages and disadvantages. Combinations of these systems are also known, however, none of the known systems are optimized to provide selective use of the backup power system in a flexible, cost efficient, and reliable manner as described herein.

In the mechanisms for consuming, generating, storing, and delivering energy that are used in conventional systems, a primary power source and backup or multiple backup power sources is/are provided. Typically, the primary power source provides power to the electrical load. Backup power sources are only activated when the primary power source either reaches critical output levels or fails. These systems are not designed to provide the most efficient, economic use of the power consumed by the electrical load.

In practice, residential, commercial and industrial buildings are electrical loads connected to one or more local power utility providers which provide power to their customers from a local power utility grid. The costs associated with drawing power from a local power utility grid are associated with market forces including the total amount of power being drawn by all users of the power utility grid at any given time, and the amount of available power. For example, on a hot, summer day it is likely that the local power utility grid will experience heavy loads during the early morning when a large number of power users are preparing for the work day, during the mid-afternoon when outside temperatures are at their trough or peak and customers are drawing more power to their heating or air conditioning units. During these times, the rate at which the power utility charges its consumers for power is at its highest. To save on power consumption costs, it would be ideal for the consumer to switch to a cheaper source of power during these times. The present invention provides a system and method of consuming, generating, storing, and delivering redundant energy to the electrical load to mitigate the risk of a power outage while also providing a mechanism for reducing power consumption costs.

SUMMARY

The present invention provides a system and methods for consuming, generating, storing and delivering renewable energy to an electrical load. In a preferred embodiment, the electrical load is a building or facility, including but not limited to a data center or co-location facility, which are known to consume large quantities of power. The system and methods described herein provide redundant, backup power to the electrical load to mitigate the risk of power loss to the electrical load, and to provide for the most efficient, economic use of the power source.

In one embodiment, the system provides a power source, specifically, the power drawn from the local power utility. This power source is electrically connected to an electrical load and to a battery array or a plurality of arrays of batteries. Note that a battery array, as describe in this application, may refer to a single battery or a plurality of batteries grouped together and electrically connected to a common pole or electrical load. The power source is provided with output controls and sensors. The output controls provided to the power source control the flow of power from the power source. The sensors provided to the power source measure the rate and quantity of power flowing from the power source.

An array of batteries, or arrays of batteries disclosed herein may be configured as a group or groups of batteries connected in series or in parallel. Each battery or array of batteries is provided with a separate electrical connection to the power utility. Each battery or array of batteries is also provided with its own set of input and output controls and sensors. Each battery or array of batteries may also be provided with its own independent power control system computer and power control system software stored on a computer readable medium. The input and output controls are used to control the charging state of the battery or array of batteries. Each battery or array of batteries may be in one of the following charging states: charged, discharging, charging, partially charged, or discharged. When batteries are in the charged state, they are at their maximum charge and not drawing power from any source. When a battery or array of batteries is in the discharging state, power is being delivered from the array of batteries to an electrical load. When a battery or array of batteries is in the charging state, power is being delivered from a power source, such as a power utility or a generator, to the battery or array of batteries. When batteries are partially charged, some power remains in the array of batteries but power is neither being delivered to nor being drawn from the array of batteries. When batteries are in the discharged state, they have a voltage below its end limit setting. The sensors are used to measure the level of a battery or battery array's charge, the rate of charge provided to the array of batteries, and the rate of discharge from the array of batteries. Each battery or array of batteries is also provided with its own independent electrical connection to the electrical load.

A set of input and output controls and sensors is also provided at the electrical load. The input and output controls comprise a control algorithm used to govern which source of power the electrical load draws from. The input and output sensors are used to measure the quality, quantity, and rate of power delivered to the electrical load.

The system also provides a power control system computer and power control system software installed, stored, and operated on a computer readable medium. The power control system computer receives, processes, stores, and transmits input and output signals to and from the input and output controls of each battery or array of batteries, the power source or sources, and the electrical load. The power control system software provides a control algorithm governing the management, selection, and operation of the systems disclosed herein. The power control system also receives data from the sensors associated with each battery, array of batteries, power source(s), and the electrical load. The power control system computer is configured to: analyze the data it receives from the sensors; determine and select the most cost effective method for delivering a sufficient load of power to the electrical load; sense whether a power delivery failure or some other type of problem from the power source or an array of batteries has occurred and automatically or proactively switch to a backup power source; and direct power from the power source to the array of batteries or plurality of arrays of batteries. The power control system computer is configured to direct power to the electrical load from the power source alone, from a single array of batteries, from multiple arrays of batteries, or from a combination thereof. In some embodiments the power control system computer uses blockchain technology or equivalent software to track, monitor, and/or record the quantities of electric power drawn from the power utility; generated by generators; drawn from generators; delivered to a battery or array of batteries; drawn from a battery or array of batteries; delivered to and/or consumed by an electrical load; record the times and dates of each transmittal of power to and from the same parts of the overall system; and identify which parts of the overall system participated in each exchanged of power. In a preferred embodiment of the invention each battery or array of batteries is provided with its own, independent power control system computer and power control system software installed, stored, and operated on a computer readable medium.

In an alternative embodiment, the system provides a power generator as the power source. In this embodiment the power generator is similarly provided with a set of output controls and sensors and acts in the same manner as the power source summarized in the previous embodiment.

In a preferred embodiment, the system provides both the power utility source and a power generator as redundant sources of energy delivered to the array of batteries or to the plurality of arrays of batteries, and also to the electrical load. In this embodiment the electrical load is electrically connected to each one of the power utility source, the power generator, and the battery, array of batteries, or plurality of arrays of batteries. In this preferred embodiment of the system the electrical load is provided with at least three redundant sources of energy (the power utility, the power generator, and at least one battery or array of batteries). The power control system software determines and selects the most efficient, economic source of energy in real-time, and instructs the system to draw power from that selected power source, or sources, to the electrical load. The power control system computer may control the supply of power to the electrical load from one of the power sources or from multiple, parallel power sources. The power control system computer may record the times and dates of each transmittal of power to and from the same parts of the overall system, and identify which parts of the overall system participated in each exchanged of power.

BRIEF DESCRIPTION OF THE DRAWINGS

These and other aspects and features of the present invention will become apparent to those of ordinary skill in the art upon review of the following description of specific embodiments of the invention in conjunction with the accompanying figures, wherein.

DETAILED DESCRIPTION OF THE PREFERRED EMBODIMENTS

The present invention provides systems and methods for consuming, generating, storing and delivering renewable, redundant energy to an electrical load. The power generated from the power sources disclosed herein is transmitted to an inverter, which is commonly known in the art as an electronic device or circuitry that changes direct current (DC) to alternating current (AC). In a preferred embodiment, the electrical load may be a building or facility, including but not limited to a data center or co-location facility, which are known to consume large quantities of power. Note that a battery array, as describe in this application, may refer to a single battery or a plurality of batteries grouped together and electrically connected to a common pole or electrical load.

Figure 1:
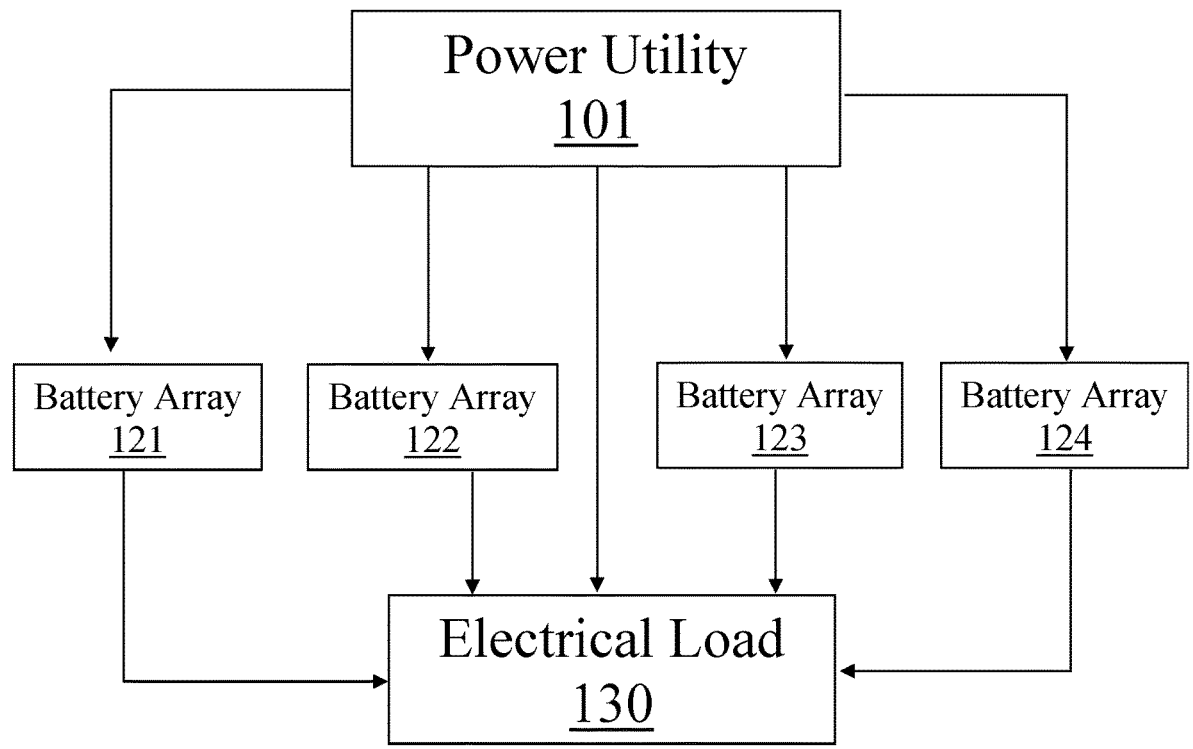
FIG. 1 is a schematic diagram of an embodiment of the renewable energy consumption, generation, storage, and distribution system.

FIG. 1 shows a schematic diagram of one embodiment of the renewable energy consumption, generation, storage, and distribution system 100 providing a power source, specifically, the power drawn from the power utility 110. The power utility 110 is electrically connected to the electrical load 130. In this configuration the electrical load 130 is optionally entirely powered by the power utility 110 alone. The power utility 110 is also electrically connected to a single array of batteries 121 or to a plurality of arrays of batteries (121, 122, 123, 124). The power utility 110 is configured to charge, in sequence or simultaneously, each array of batteries 12n that it is connected to. The electrical load 130 is electrically connected to the power utility 110 and an array of batteries 121 or to the plurality of arrays of batteries (121, 122, 123, 124), which may be connected in series or in parallel with one or more electrical pathways to ensure no single point of failure. The electrical load 130 is configured to draw power from, in sequence or simultaneously, each array of batteries 12n that it is connected to in addition to the power utility 110.

Figure 2:
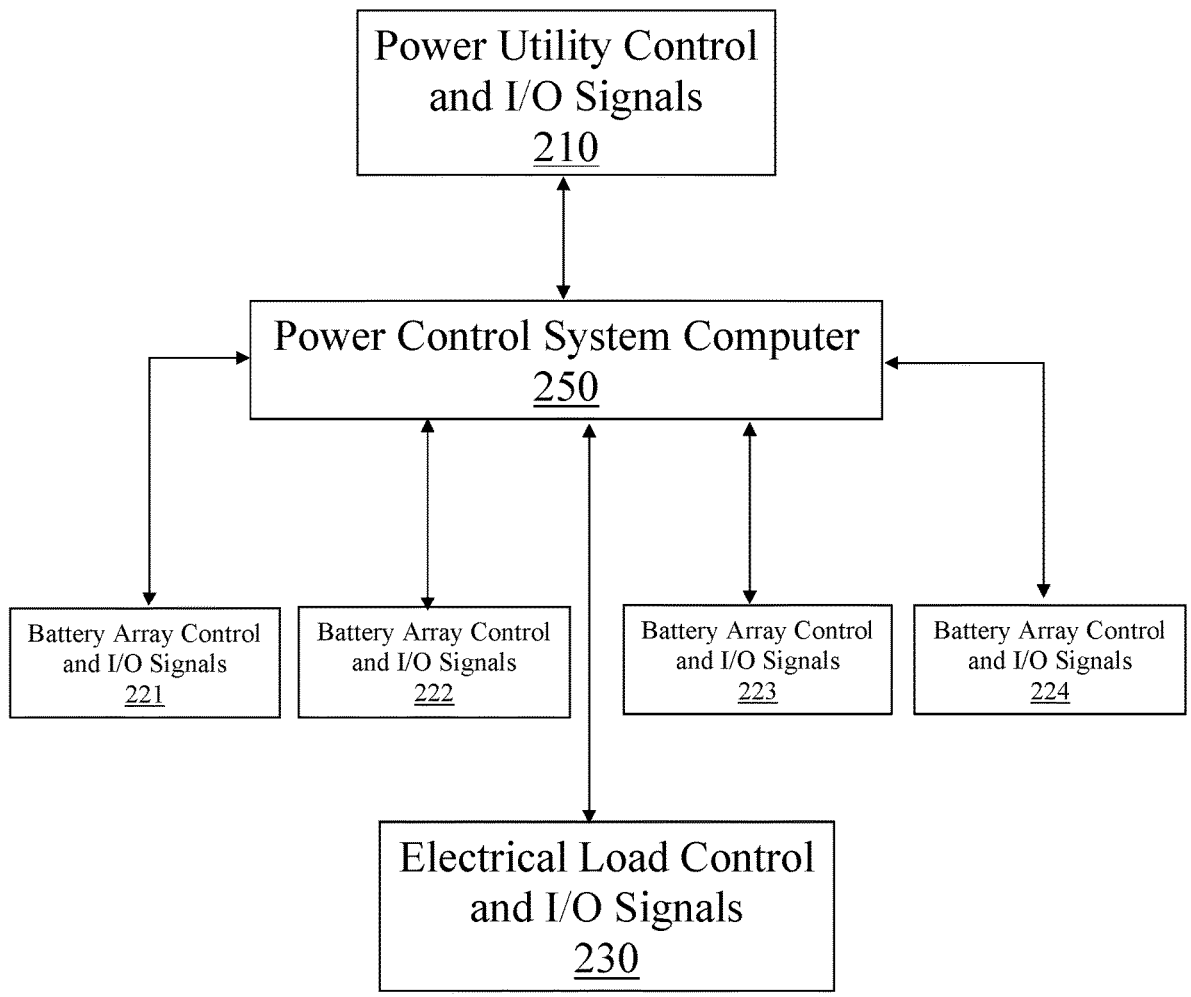
FIG. 2 illustrates a power control system provided with the system of FIG. 1.

FIG. 2 illustrates a power control system 200 provided with the system 100 of FIG. 1. The connections between the power utility 110, the arrays of batteries 12n, and the electrical load 130 are each provided with input and output sensors of the type known to those of ordinary skill in the art. Output sensors provided for the power utility 110 measure the rate and quantity of power flowing from the power utility 110. The output sensors provide this information to a power control system computer 250. The power control system computer 250 processes information and instructions provided by power control system software stored on a computer readable medium. Output sensors provided for each array of batteries 12n measure the rate, quality, and quantity of power flowing from the array or arrays of batteries 12n to the electrical load 130, and provide the information to the power control system computer 250. Input sensors provided for each array of batteries 12n measure the rate, quality, and quantity of power flowing from the power utility 110 to each array of batteries 12n. Input sensors provided for the electrical load 130 measure the rate, quality, and quantity of power flowing to the electrical load from each source of power (power utility 110 and each array of batteries 12n) and provide the information to the power control system computer 250. In an embodiment of the invention, each array of batteries may be provided with its own, independent power control system computer and power control system software stored on a computer readable medium.

The power utility 110 and each array of batteries 12n are provided with output controls of the type known to those of ordinary skill in the art. The electrical load 130 and each array of batteries 12n are provided with input controls of the type known to those of ordinary skill in the art. The input and output controls for the power utility 110, each array of batteries 12n, and electrical load 130 respond to signals from the power control system computer 250 to control the flow of power between each connected element as configured in FIG. 1.

The power control system computer 250 continuously monitors and reads the purchase price of power from all available sources on the energy trading power market. A user may program the power control system computer 250 to respond to increases and decreases of the purchase price of power on the energy trading power market by stopping the electrical load and/or batteries from drawing power from the local power utility and instead instructing the electrical load to only draw power from the batteries in response to a rise in the price of power on the power market above a user defined, predetermined value. Alternatively, the power control system computer 250 may instruct the electrical load to stop drawing power from the batteries and instead draw power from the local power utility in response to a drop in the price of power on the power market below a user defined, predetermined value. Similarly, the power control system computer 250 may instruct the batteries to draw and store power from the local power utility in response to a drop in the price of power on the power market below a user defined, predetermined value. These controls may also be overridden at any time as instructed by a user who may manually control the flows of electrical power to and from the different parts of the overall system.

The power control system computer 250 receives and transmits signals to and from the input and output sensors and controls of the power utility 110, each array of batteries 12n, and the electrical load 130. The power control system computer is configured to: analyze the data it receives from the sensors; determine and select the most cost effective method for delivering a sufficient load of power to the electrical load; sense whether a power delivery failure from the power source or an array of batteries has occurred and automatically switch to a backup power source; and direct power from the power source to the array of batteries or plurality of arrays of batteries. The power control system computer is configured to direct power to the electrical load from the power source alone, from a single array of batteries, from multiple arrays of batteries, or from a combination thereof.

Recognizing that the costs associated with drawing power from power utility 110 are associated with market forces— including, but not limited to: the total amount of power being drawn by all users of the power utility at any given time, and the amount of available power—the power control system computer 250 will cause the electrical load 130 to draw power from the available arrays of batteries 12n when the rate at which the power utility charges its consumers for power is at its highest. For example, on a hot, summer or cold, winter day it is likely that the power utility will experience heavy loads during the early morning or midafternoon when outside temperatures are at their trough or peak and more customers are drawing power to their heating or air conditioning units. During these times, the rate at which the power utility charges its consumers for power is at its highest. To save on power consumption costs, the power control system computer 250 causes the electrical load 130 to switch to drawing power from the cheaper source of power stored in the arrays of batteries 12n during these times. Likewise, the power control system computer 250 will ideally cause the arrays of batteries 12n to enter a charging state during the low rate hours when the cost of drawing power from the power utility is at its lowest.

The power control system computer 250 is configured to control the flow of power to and from each connected element of the system 100 independently. One or more arrays of batteries 12n may be in a charging state, a discharging state, a charged state, a discharged state, or a partially charged state simultaneously relative to each other. The controls controlling the state of each array of batteries 12n act independently from one another at the direction of the power control system computer 250. Additionally, the electrical load 130 may draw power from the power utility 110, a single array of batteries 121, or a plurality of arrays of batteries (121, 122, 123, 124) or some combination thereof. The power control system computer 250 selects the sources from which the electrical load 130 draws power for the purposes of preventing power outages to the electrical load 130 and reducing the cost of drawing power from the power utility 110.

The ability of the power control system computer 250 to cycle between a single or multiple sources of power delivering to the electrical load 130 mitigates the risk of the electrical load 130 suffering an outage. Because the power control system computer 250 reads information about the rate and quantity of power flowing from the power utility 110 and arrays of batteries 12n, and into the electrical load 130, the power control system computer 250 can react to spikes or lulls in power drawn from the power utility 110 by distributing power from the arrays of batteries 12n to the electrical load 130 to prevent outages. As an additional safeguard against an outage, arrays of batteries 12n are configured to be charged by the power utility 110 at a faster rate than discharge to the electrical load 130 occurs. In the event that a disconnect or interruption between the power utility 110 and the electrical load 130 occurs, the power control system 250 may select an array of batteries 12n or plurality of arrays to power the electrical load 130 while the power utility 110 continues to recharge the array of batteries 12n as needed. The risk of power loss to the electrical load 130 would then be mitigated by the power utility's 110 ability to recharge the array of batteries 12n faster than the electrical load 130 can discharge the array of batteries 12n.

The power control system computer 250 is configured to: analyze the data it receives from the sensors; determine and select the most cost effective method for delivering a sufficient load of power to the electrical load 130; sense whether a power delivery failure from the power utility 110 or an array of batteries 12n has occurred and automatically switch to a backup power source; and direct power from the power utility 110 to an array of batteries 121 or plurality of arrays of batteries (121, 122, 123, 124). The power control system computer 250 is configured to direct power to the electrical load 130 from the power utility alone, from a single array of batteries 121, from multiple arrays of batteries 12n, or from a combination thereof.

The present embodiment contemplates a method of delivering power to an electrical load 130 wherein a power utility 110 connection is provided, an array of batteries 121 or plurality of arrays of batteries 12n are provided, a power control system computer 250 is provided, and input and output sensors and controls are provided for each of the power utility 110, arrays of batteries 12n, and electrical load 130, and wherein the power control system computer 250 delivers power from the available power sources to the electrical load 130 in contemplation of the information received from the sensors to prevent power outages to the electrical load 130 and to lower costs associated with drawing power from the power utility 110.

Although the present embodiment has been particularly described and shown in FIGS. 1 and 2, with reference to up to four arrays of batteries, it should be readily apparent to those of ordinary skill in the art that as many arrays of batteries as needed to optimally service the electrical load may be used without departing from the spirit and scope of the invention.

Figure 3:
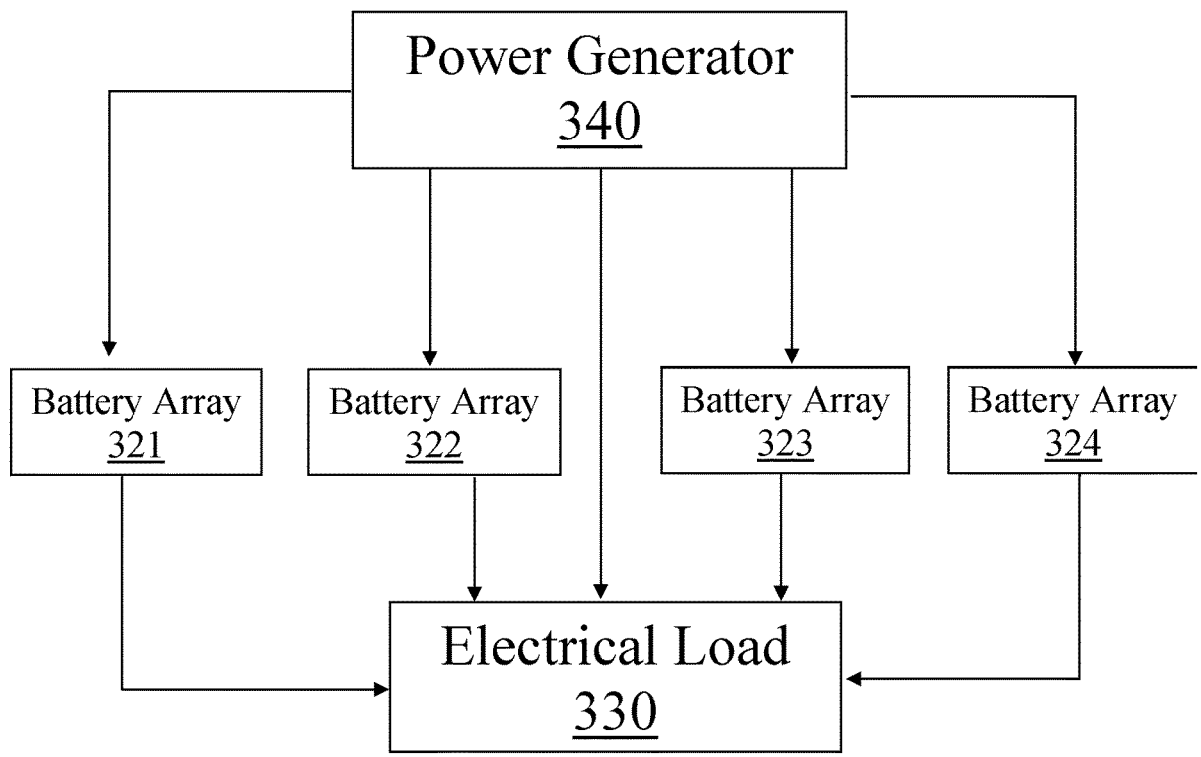
FIG. 3 is a schematic diagram of another embodiment of the renewable energy consumption, generation, storage, and distribution system.

In an alternative embodiment, FIG. 3 shows a schematic diagram of the renewable energy consumption, generation, storage, and distribution system 300, providing a power source, specifically, a power generator 340. In this embodiment the power generator 340 is similarly provided with and connected to an array of batteries 321 or plurality of arrays of batteries (321, 322, 323, 324) connected in series or in parallel, and electrical load 330, with one or more electrical pathways to ensure no single point of failure.

Figure 4:
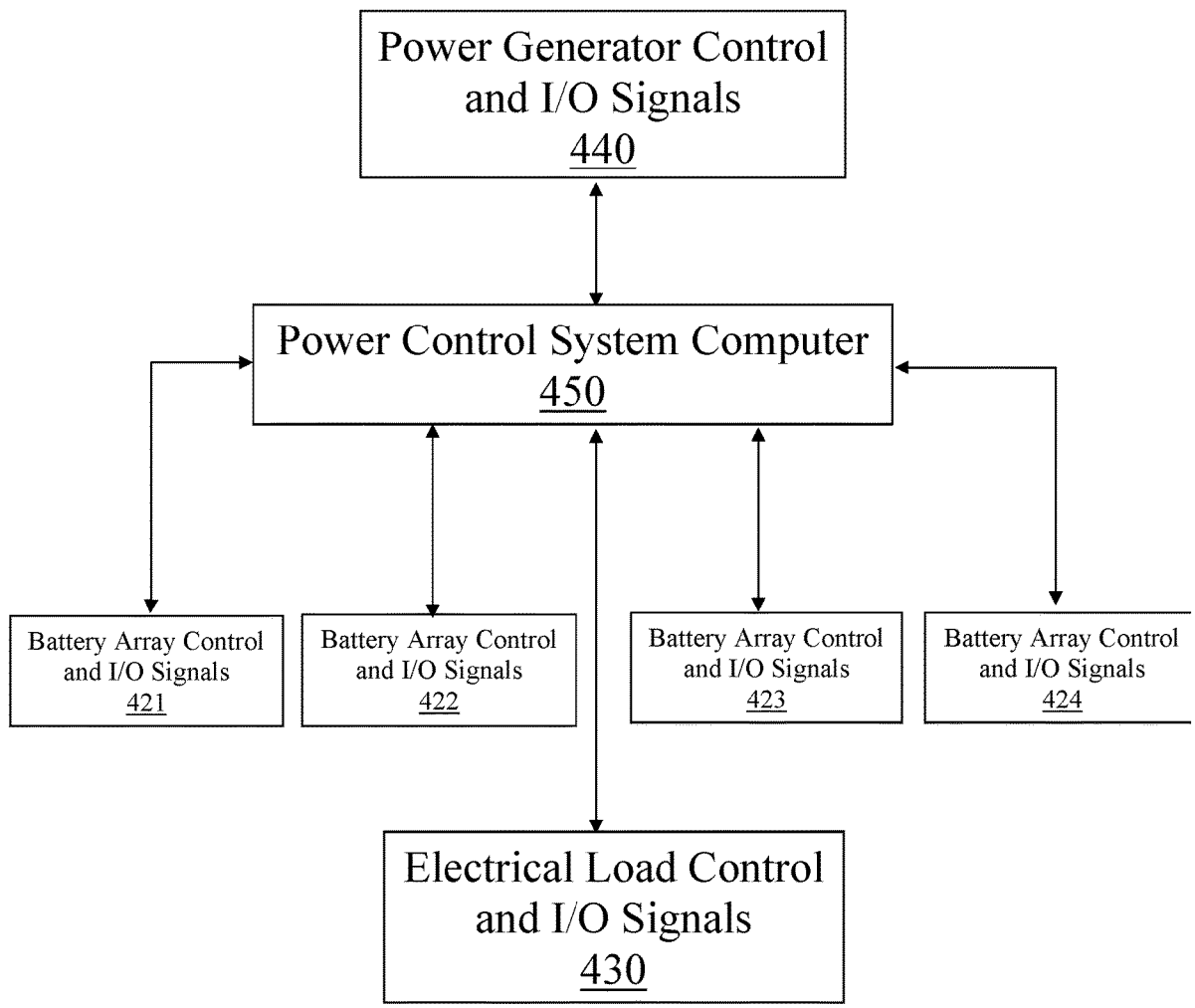
FIG. 4 illustrates a power control system provided with the system of FIG. 4.

Similarly, FIG. 4 illustrates a power control system 400 providing a power control system computer 450 and power control system software stored on a computer readable medium which reads input and output sensors and transmits signals to controls provided with the generator 340, arrays of batteries 32n, and electrical load 330 and acts in the same manner with the same objectives as the power control system 200 summarized in the previous embodiment. As an additional safeguard against an outage, arrays of batteries 321 are configured to be charged by the generator 340 at a faster rate than discharge to the electrical load 330 occurs. In the event that a disconnect or interruption between the generator 340 and the electrical load 330 occurs, the power control system 450 may select an array of batteries 321 or plurality of arrays to power the electrical load 330 while the generator 340 continues to recharge the array of batteries 321 as needed. The risk of power loss to the electrical load 330 would then be mitigated by the generator's 340 ability to recharge the array of batteries 321 faster than the electrical load 330 can discharge the array of batteries 321.

The power control system computer 450 continuously monitors and reads the purchase price of power generator fuels from all available sources on the fuel trading markets. A user may program the power control system computer 450 to respond to increases and decreases of the purchase price of power generator fuels on the fuel trading markets by stopping the electrical load and/or batteries from drawing power from the power generator and instead instructing the electrical load to only draw power from the batteries in response to a rise in the price of fuels consumed by power generators on the fuel markets above a user defined, predetermined value. Alternatively, the power control system computer 450 may instruct the electrical load to stop drawing power from the batteries and instead draw power from the power generator in response to a drop in the price of fuels consumed by the power generator on the fuel markets below a user defined, predetermined value. The power control system computer 450 may instruct the batteries to draw and store power from the power generator in response to a drop in the price of fuels consumed by the power generators on the fuel markets below a user defined, predetermined value. These controls may also be overridden at any time as instructed by a user who may manually control the flows of electrical power to and from the different parts of the overall system.

The present embodiment contemplates a method of delivering power to an electrical load 330 wherein a power generator 340 connection is provided, an array of batteries 321 or plurality of arrays of batteries 32n are provided, a power control system computer 450 and power control system software stored on a computer readable medium is provided, and input and output sensors and controls are provided for each of the power generator 340, arrays of batteries 32n, and electrical load 330, and wherein the power control system computer 450 instructs the system to deliver power from the available power sources to the electrical load 330 in contemplation of the information received and processed by the power control system software from the sensors to prevent power outages to the electrical load 330 and to lower costs associated with consuming resources powering the generator 340. In an embodiment of the invention, each array of batteries is provided with its own power control system computer and power control system software stored on a computer readable medium.

Although the present embodiment has been particularly described and shown in FIGS. 3 and 4, with reference to up to four arrays of batteries, it should be readily apparent to those of ordinary skill in the art that as many arrays of batteries as needed to optimally service the electrical load may be used without departing from the spirit and scope of the invention.

Figure 5:
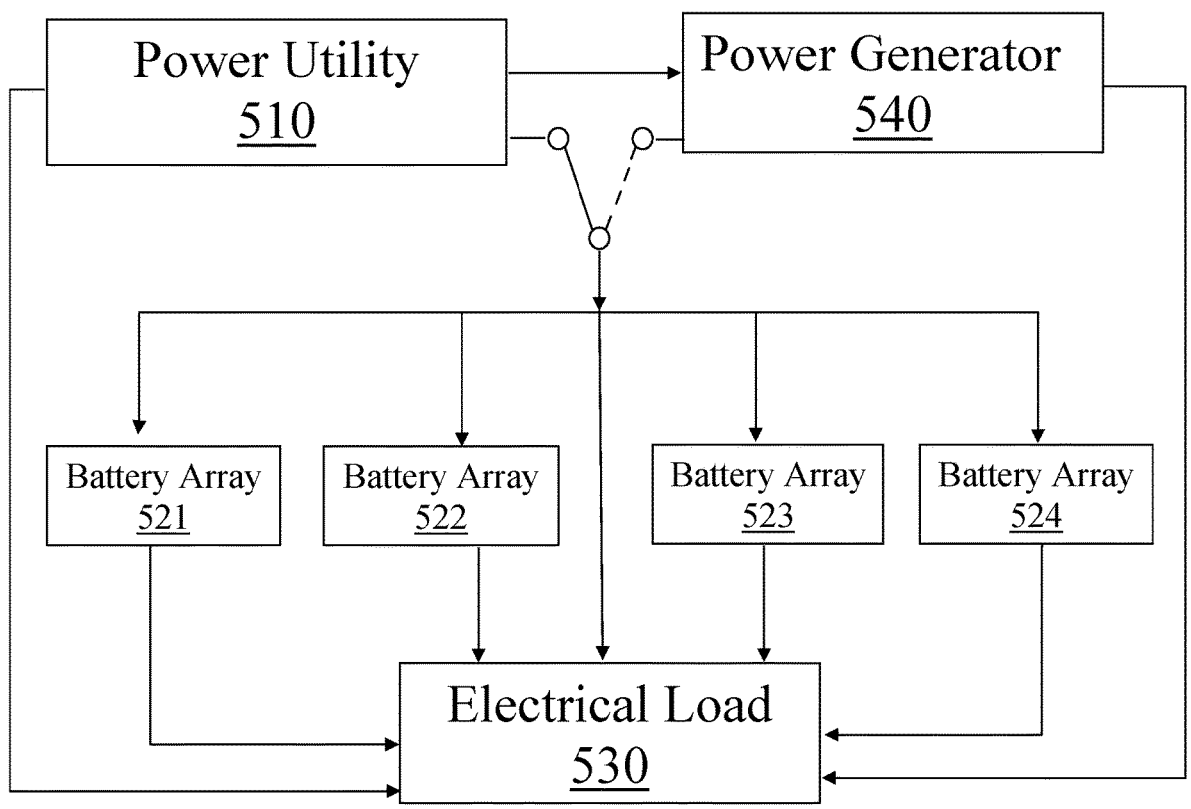
FIG. 5 is a schematic diagram of the preferred embodiment of the renewable energy storage and transmission system.
Figure 6:
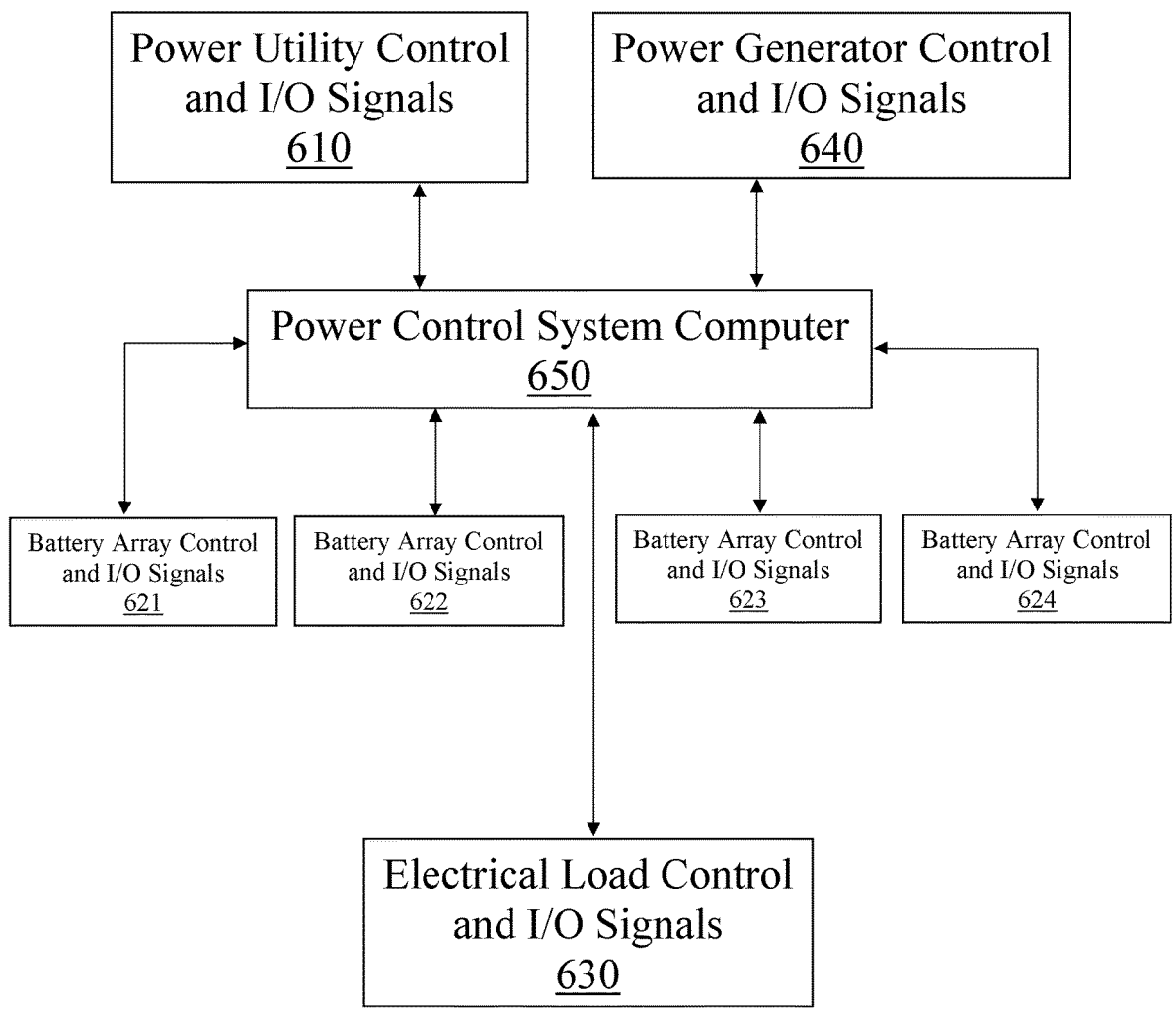
FIG. 6 illustrates a power control system provided with the system of FIG. 5.

In a preferred embodiment, FIG. 5 shows a schematic diagram of the renewable energy consumption, generation, storage, and distribution system 500, providing both the power utility 510 and a power generator 540 as redundant sources of energy transmitted to an array of batteries 521 or to a plurality of arrays of batteries (521, 522, 523, 524) connected in series or in parallel, and also to the electrical load 530. In this embodiment the electrical load 530 is electrically connected to each one of the power utility 510, the power generator 540, and the array of batteries 521 or plurality of arrays of batteries (521, 522, 523, 524) with one or more electrical pathways to ensure no single point of failure. In this preferred embodiment of the system 500, the electrical load is provided with at least three redundant sources of energy (power utility 510, the power generator 540, and at least one array of batteries 52n). In this embodiment, the power generator 540 is configured to receive power from the power utility 510. FIG. 6 illustrates a power control system computer 650 for processing power control system software stored on a computer readable medium which selects the most efficient, economic source of energy in real-time, and reacts by instructing the system to draw power from the selected power source or sources to the electrical load 530 while reacting to the load needs of the electrical load 530 to prevent a power outage.

FIG. 6 illustrates a power control system 600 provided with the system 500 of FIG. 5. The connections between the power utility 510, the power generator 540 the arrays of batteries 52n, and the electrical load 530 are each provided with input and output sensors of the type known to those of ordinary skill in the art. Output sensors provided for the power utility 510 and power generator 540 measure the rate and quantity of power flowing from the power utility 510 and power generator 540 respectively. The output sensors provide this information to a power control system computer 650 which processes power control system software stored on a computer readable medium. Similarly, output sensors provided for each array of batteries 52n measure the rate, quality, and quantity of power flowing from the array or arrays of batteries 52n to the electrical load 530, and provide the information to the power control system computer 650. Input sensors provided for the power generator 540 and each array of batteries 52n measure the rate, quality, and quantity of power flowing from the power utility 510 to the power generator 540 and each array of batteries 52n. Input sensors provided for the electrical load 530 measure the rate, quality, and quantity of power flowing to the electrical load from each source of power (power utility 510, power generator 540, and each array of batteries 52n) and provide the information to the power control system computer 650.

The power utility 510, power generator 540, and each array of batteries 52n are provided with output controls of the type known to those of ordinary skill in the art. The electrical load 530 and each array of batteries 52n are provided with input controls of the type known to those of ordinary skill in the art. The input and output controls for the power utility 510, the power generator 540, each array of batteries 52n, and electrical load 530 respond to signals from the power control system computer 650 to control the flow of power between each connected element as configured in FIG. 5.

The power control system computer 650 receives and transmits signals to and from the input and output sensors and controls of the power utility 510, the power generator 540, each array of batteries 52n, and the electrical load 530. The power control system computer 650 and power control system software stored on a computer readable medium are configured to: analyze the data it receives from the sensors; determine and select the most cost effective method for delivering a sufficient load of power to the electrical load by similar methods to those described in aforementioned embodiments; sense whether a power delivery failure from the power source or an array of batteries has occurred and automatically switch to a backup power source; and direct power from the power source to the array of batteries 521 or plurality of arrays of batteries 52n. The power control system computer 650 is configured to control the transmission of power to the electrical load 530 from the power source alone, from a single array of batteries 521, from multiple arrays of batteries 52n, or from a combination thereof. In one embodiment of the invention, the power control system computer 650 uses blockchain technology to track and document the purchase price and quantity of power purchased from the different power sources described herein, and to track and document the flow of quantities of power to and from the batteries, battery arrays, generators, local power utility, and the electrical load. This method may provide an added benefit of more accurately reflecting the quantity of power available to the electrical load, and to all users of power on the local power utility's electrical power grid. In an embodiment of the invention, each battery array may be provided with its own power control system computer and power control software stored on a computer readable medium.

Recognizing that the costs associated with drawing power from power utility 510 are associated with market forces—including, but not limited to: the total amount of power being drawn by all users of the power utility at any given time, and the amount of available power—the power control system computer 650 will cause the electrical load 530 to draw power from the available arrays of batteries 52n when the rate at which the power utility charges its consumers for power is at its highest and/or when the costs for resources used to power the generator are at their peak. For example, on a hot, summer or cold, winter day it is likely that the power utility will experience heavy loads during the early morning or mid-afternoon when outside temperatures are at their trough or peak and more customers are drawing power to their heating or air conditioning units. During these times, the rate at which the power utility charges its consumers for power is at its highest. To save on power consumption costs, the power control system computer 650 instructs the electrical load 530 to switch to drawing power from the cheaper sources of power generated by the power generator 540, or by the power stored in the arrays of batteries 52n, during these times. Likewise, the power control system computer 650 will ideally cause the arrays of batteries 52n to enter a charging state during the low rate hours when the cost of drawing power from the power utility or power generator are at their lowest.

The power control system computer 650 is configured to control the flow of power to and from each connected element of the system 500 independently. Alternatively, each array of batteries is provided with its own, independent power control system computer and power control system software stored on a computer readable medium. One or more arrays of batteries 52n may be in a charging state, a discharging state, a charged state, a discharged state, or a partially charged state simultaneously relative to each other. The controls controlling the state of each array of batteries 52n act independently from one another at the direction of the power control system computer 650. Additionally, the electrical load 530 may draw power from the power utility 510, the power generator 540, a single array of batteries 521, or a plurality of arrays of batteries (521, 522, 523, 524) or some combination thereof. The power control system computer 650 selects the sources from which the electrical load 530 draws power for the purposes of preventing power outages to the electrical load 530 and reducing the cost of drawing power from the power utility 510 and from consuming resources that power the generator 540.

The ability of the power control system computer 650 to cycle between a single or multiple sources of power delivering to the electrical load 530 mitigates the risk of the electrical load 530 suffering an outage. The power control system computer 650 can predict and react to spikes or lulls in power drawn from the power utility 510 by distributing power from the arrays of batteries 52n to the electrical load 530 to prevent outages. As an additional safeguard against an outage, arrays of batteries 52n are configured to be charged by the power utility 510 and/or generator 540 at a faster rate than discharge to the electrical load 530 occurs. In the event that a disconnect or interruption between the power utility 510 and/or generator 540 and the electrical load 530 occurs, the power control system 650 may select an array of batteries 52n or plurality of arrays to power the electrical load 530 while the power utility 510 and/or generator 540 continue(s) to recharge the array of batteries 52n as needed. The risk of power loss to the electrical load 530 would then be mitigated by the generator's 540 ability to recharge the array of batteries 52n faster than the electrical load 530 can discharge the array of batteries 52n.

The power control system computer 650 and power control system software stored on a computer readable medium are configured to: analyze the data it receives from the sensors; determine and select the most cost effective method for delivering a sufficient load of power to the electrical load 530; sense whether a power delivery failure from the power utility 510, power generator 540, or an array of batteries 52n has occurred and automatically switch to a backup power source; and direct power from the power utility 510 to an array of batteries 521 or plurality of arrays of batteries (521, 522, 523, 524). The power control system computer 650 is configured to direct power to the electrical load 530 from the power utility 510 alone, from the power generator 540 alone, from a single array of batteries 521, from multiple arrays of batteries 52n, or from a combination thereof.

The present embodiment contemplates a method of delivering power to an electrical load 530 wherein a power utility 510 connection is provided, a power generator 540 is provided, an array of batteries 521 or plurality of arrays of batteries 52n are provided, a power control system computer 650 is provided, and input and output sensors and controls are provided for each of the power utility 510, power generator 540, arrays of batteries 502n, and electrical load 530, and wherein the power control system computer 650 delivers power from the available power sources to the electrical load 530 in contemplation of the information received from the sensors to prevent power outages to the electrical load 530 and to lower costs associated with drawing power from the power utility 510 and consuming resources powering the generator 540.

Although the present embodiment has been particularly described and shown in FIGS. 5 and 6, with reference to up to four arrays of batteries, it should be readily apparent to those of ordinary skill in the art that as many arrays of batteries as needed to optimally service the electrical load may be used without departing from the spirit and scope of the invention.

Although the present invention has been particularly described with reference to embodiments thereof, it should be readily apparent to those of ordinary skill in the art that various changes, modifications and substitutes are intended within the form and details thereof, without departing from the spirit and scope of the invention. Accordingly, it will be appreciated that in numerous instances some features of the invention will be employed without a corresponding use of other features. Further, those skilled in the art will understand that variations can be made in the number and arrangement of components illustrated in the above figures.

What is claimed is:

1. A system for powering an electrical load comprising:
   a battery;
   a local power utility connection which electrically connects to the local power utility to deliver power to the battery or an electrical load;
   a power generator configured to generate electrical power;
   the electrical load electrically connected to be powered by one or more of the battery, the power generator, and the local power utility; and
   a power control system configured to:
   control the flow of power from the power utility to the battery;
   control the flow of power from the power utility to the electrical load;
   control the flow of power from the battery to the electrical load;
   control the flow of power from the power generator to the battery;
   control the flow of power from the power generator to the load;
   continuously read the purchase price of power on a power market;

cause the battery to enter a charging state where power is stored in the battery when the purchase price of power on the power market drops below a predetermined value; and wherein the power control system causes the electrical load to stop drawing power from the local power utility and to draw power from the battery or the power generator when the purchase price of power on the power market rises above a predetermined value.

2. The system of claim 1, wherein the electrical load is a data center.

3. The system of claim 1, wherein the battery comprises a plurality of batteries.

4. The system of claim 3, wherein the local power utility is electrically connected to deliver power to each of the plurality of batteries, the electrical load is electrically connected to be powered by the plurality of batteries and the local power utility; and the power control system is configured to control the flow of power from the power utility to each of the plurality of batteries and to control the flow of power from each of the batteries to the electrical load, and to cause each of the batteries to enter a charging state where power is stored in the battery when the purchase price of power on the power market drops below a predetermined value.

5. The system of claim 3, wherein the power control system is further configured to documents flows of power using blockchain technology.

6. A system for powering an electrical load comprising:
a battery;
a power generator electrically connected to deliver power to the battery;
an electrical load electrically connected to be powered by the battery and the power generator; and
a power control system configured to:
control the flow of power from the power generator to the battery;
control the flow of power from the generator to the electrical load;
control the flow of power from the battery to the electrical load;
continuously read the purchase price of fuel on a fuel market;
cause the battery to enter a charging state where power is stored in the battery when the purchase price of fuel consumed by the power generator drops below a predetermined value;
wherein the power control system causes the electrical load to stop drawing power from the power generator and to draw power from the battery when the purchase price of fuel on the fuel market rises above a predetermined value; and
wherein the power control system documents flows of power using blockchain technology.

7. The system of claim 6, wherein the electrical load is a data center.

8. The system of claim 6, further comprising a plurality of batteries.

9. The system of claim 8, wherein the power generator is electrically connected to deliver power to each of the plurality of batteries, the electrical load is electrically connected to be powered by the plurality of batteries and the power generator; and the power control system is configured to control the flow of power from the power generator to each of the plurality of batteries and to control the flow of power from each of the batteries to the electrical load, and to cause each of the batteries to enter a charging state where power is stored in the battery when the purchase price of fuel on the fuel market drops below a predetermined value.

10. A system for powering an electrical load comprising:
a local power utility connection electrically connected to deliver power to a battery, a power generator, and an electrical load;
the power generator electrically connected to deliver power to the battery and the electrical load;
the electrical load electrically connected to be powered by the local power utility, the power generator, and the battery; and
a power control system configured to:
control the flow of power from the local power utility to the power generator;
control the flow of power from the local power utility to the battery;
control the flow of power from the local power utility to the electrical load;
control the flow of power from the power generator to the battery;
control the flow of power from the power generator to the electrical load;
control the flow of power from the battery to the electrical load;
continuously read the purchase price of fuel on a fuel market;
continuously read the purchase price of power on a power market;
cause the battery to enter a charging state where power is stored in the battery when the purchase price of fuel consumed by the power generator or the purchase price of power on the power market drop below predetermined values; and
wherein the power control system causes the electrical load to draw power from either the local power utility, the power generator, or the battery based on a predetermined formula that calculates which power source is the cheapest.

11. The system of claim 10, wherein the electrical load is a data center.

12. The system of claim 10, further comprising a plurality of batteries connected in parallel.

13. The system of claim 12, wherein the local power utility and the power generator are each electrically connected to deliver power to each of the plurality of batteries, the electrical load is electrically connected to be powered by the local power utility, the power generator, and the plurality of batteries; and the power control system is configured to control the flow of power from the local power utility and the power generator to each of the plurality of batteries and to control the flow of power from each of the batteries to the electrical load, and to cause each of the batteries to enter a charging state where power is stored in the battery when the purchase price of power on the power market or the purchase price of fuel consumed by the power generator on the fuel market drop below predetermined values, wherein the power control system documents flows of power using blockchain technology.

* * * * *